(12) United States Patent
Uchida

(10) Patent No.: US 9,911,445 B2
(45) Date of Patent: Mar. 6, 2018

(54) MAGNETIC RECORDING MEDIUM

(71) Applicant: FUJI ELECTRIC CO., LTD., Kawasaki-shi (JP)

(72) Inventor: Shinji Uchida, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 241 days.

(21) Appl. No.: 14/678,925

(22) Filed: Apr. 3, 2015

(65) Prior Publication Data
US 2015/0213823 A1 Jul. 30, 2015

Related U.S. Application Data

(63) Continuation of application No. PCT/JP2013/004953, filed on Aug. 21, 2013.

(30) Foreign Application Priority Data

Oct. 10, 2012 (JP) .................. 2012-225308

(51) Int. Cl.
*G11B 5/65* (2006.01)
*G11B 5/73* (2006.01)
*G11B 5/738* (2006.01)

(52) U.S. Cl.
CPC ............ *G11B 5/653* (2013.01); *G11B 5/65* (2013.01); *G11B 5/738* (2013.01); *G11B 5/7315* (2013.01); *G11B 5/7325* (2013.01)

(58) Field of Classification Search
CPC ....... G11B 5/738; G11B 5/7325; G11B 5/732; G11B 5/653
See application file for complete search history.

(56) References Cited

U.S. PATENT DOCUMENTS 6,251,532 B1 6/2001 Futamoto et al.
6,641,934 B1 11/2003 Suzuki et al.
(Continued)

FOREIGN PATENT DOCUMENTS

JP 2000-322726 11/2000
JP 2001-101645 A 4/2001
(Continued)

OTHER PUBLICATIONS

Morris, http://www.mse.berkeley.edu/groups.morris/MSE200/Lecture_Notes/lecture%20slides%20-%204.pdf, UC Berkeley, fall 2008 pp. 1-.*
(Continued)

*Primary Examiner* — Holly Rickman
(74) *Attorney, Agent, or Firm* — Rabin & Berdo, P.C.

(57) ABSTRACT

A perpendicular magnetic recording medium includes a non-magnetic substrate; an underlayer including first and second underlayers; and a magnetic recording layer including a layer having a granular structure including grains of a magnetic crystal and grain boundary portions, wherein the first underlayer has a NaCl structure with a (001) orientation and contains a nitride or an oxide of at least one element. The first underlayer may contain a nitride of at least one of Cr, V, Ti, Sc, Mo, Nb, Zr, Y, Al, and B, and the second underlayer may include a plurality of island-shaped regions and contain at least one of Mg, Ca, Co, and Ni. The first underlayer may contains an oxide of at least one of Mg, Ca, Co, and Ni, and the second underlayer may include net-shaped regions and contain at least one of Cr, V, Ti, Sc, Mo, Nb, Zr, Y, Al, B, and C.

14 Claims, 4 Drawing Sheets

(56) References Cited

U.S. PATENT DOCUMENTS

| | | |
|---|---|---|
| 6,667,116 B1 | 12/2003 | Uwazumi et al. |
| 2004/0110035 A1 | 6/2004 | Shin et al. |
| 2004/0185307 A1 | 9/2004 | Oikawa et al. |
| 2005/0196649 A1 | 9/2005 | Inamura et al. |
| 2009/0142621 A1* | 6/2009 | Peng .................. C23C 14/0036 428/831 |
| 2012/0225325 A1 | 9/2012 | Nemoto et al. |
| 2014/0063656 A1 | 3/2014 | Hashimoto |
| 2014/0093748 A1* | 4/2014 | Chen .................. G11B 5/7325 428/831 |

FOREIGN PATENT DOCUMENTS

| | | |
|---|---|---|
| JP | 2004-152471 | 5/2004 |
| JP | 2004-213869 | 7/2004 |
| JP | 2008-091009 | 4/2008 |
| JP | 2010-503139 | 1/2010 |
| JP | 2012-181902 | 9/2012 |
| WO | WO-2004/075178 | 9/2004 |
| WO | WO-2008/030199 | 3/2008 |
| WO | WO-2012/157600 | 11/2012 |
| WO | WO 2014/057600 A1 * | 4/2014 |

OTHER PUBLICATIONS

Tilley, http://onlinelibrary.wiley.com/doi/10.1002/9780470380758.oth1/pdf, Defects in Solids, Published Online: Feb. 29, 2008, pp. 447-460.*

* cited by examiner

MAGNETIC RECORDING MEDIUM

CROSS-REFERENCE TO RELATED APPLICATION(S)

This non-provisional application is a continuation of and claims the benefit of the priority of Applicant's earlier filed International Application No. PCT/JP2013/004953 filed Aug. 21, 2013, the entire contents of which are incorporated herein by reference.

BACKGROUND OF THE INVENTION

1. Field of the Invention

The present invention relates to a magnetic recording medium mounted on various magnetic recording apparatuses.

2. Description of the Related Art

A perpendicular magnetic recording medium has been employed as a technique for achieving higher magnetic recording density. A perpendicular magnetic recording medium includes at least a non-magnetic substrate and a magnetic recording layer formed from a hard magnetic material. The perpendicular magnetic recording medium may optionally further include a soft magnetic underlayer that performs a role of concentrating a magnetic flux generated by a magnetic head on the magnetic recording layer, an underlayer for aligning the hard magnetic material of the magnetic recording layer in a desired direction, a protective layer that protects the surface of the magnetic recording layer, and other layers.

As the hard magnetic material, a granular magnetic material in which a non-magnetic material, such as $SiO_2$ or $TiO_2$, is added to a magnetic alloy material, such as CoCrPt or CoCrTa, has been proposed. For example, a film of CoCrPt—$SiO_2$ granular magnetic material has a structure in which $SiO_2$, which is a non-magnetic material, is segregated so as to surround CoCrPt magnetic crystal grains. Here, the individual CoCrPt magnetic crystal grains are magnetically decoupled by $SiO_2$ which is the non-magnetic material.

In recent years, there is a need to further improve recording density of a perpendicular magnetic recording medium. Specifically, a perpendicular magnetic recording medium capable of achieving linear recording density of 1500 kFCI (field changes per inch) or higher is required. As means for realizing such a linear recording density, reducing the size of magnetic crystal grains in the granular magnetic material has been studied. However, a reduction in the size of the magnetic crystal grains results in deterioration in thermal stability of recorded magnetizations (recorded signals). In order to compensate for the deterioration in thermal stability, it is required to improve crystalline magnetic anisotropy of the magnetic alloy material in the granular magnetic material.

A $L1_0$-based ordered alloy is one of the materials having the required high crystalline magnetic anisotropy. On the other hand, the non-magnetic substrate of the magnetic recording medium is formed using aluminum or glass in order to satisfy the required substrate characteristics such as strength or impact resistance. An underlayer is important when forming a $L1_0$-based ordered alloy film is formed on the surface of the non-magnetic substrate. This is because the crystals of the $L1_0$-based ordered alloy need to have (001) orientation (the [001] axis of the crystal needs to be perpendicular to the principal surface of the non-magnetic substrate) in order to realize high crystalline magnetic anisotropy.

In general, in order to realize desired crystal orientation of a $L1_0$-based ordered alloy, MgO or $SrTiO_3$ having an appropriate lattice misfit with respect to the $L1_0$-based ordered alloy has been used as the underlayer. For example, Japanese Patent Application Publication No. 2001-101645 (Patent Document 1) indicates that in a structure in which a soft magnetic material layer, a non-magnetic material layer, and an information recording layer formed from a $L1_0$-based ordered alloy are sequentially formed, when MgO is used as the non-magnetic material, the crystallinity, the crystal orientation, and the magnetic characteristics of the information recording layer formed from the $L1_0$-based ordered alloy are improved (see Patent Document 1). Alternatively, WO-2004/075178 (Patent Document 2) discloses a magnetic recording medium having a stacked structure including a soft magnetic underlayer, a first orientation control layer formed from a magnetic material, a second non-magnetic orientation control layer, and a magnetic recording layer containing crystal grains having a $L1_0$ structure (see Patent Document 2). However, the thin films, i.e., the information recording layer and the magnetic recording layer, of the $L1_0$-based ordered alloy disclosed in these documents do not have a granular structure. Thus, the recording density (resolution) of the magnetic recording signal is approximately 220 kFRPI (flux reversals per inch, see Patent Document 1) and 400 kFCI, see (Patent Document 2).

In order to further improve the recording density (resolution), a thin film of $L1_0$-based ordered alloys having a granular structure capable of reducing the size of magnetic crystal grains and improving magnetical decoupling between the magnetic crystal grains while securing the crystallinity and crystal orientation of the thin film of $L1_0$-based ordered alloys has been studied. For example, Japanese Patent Application Publication No. 2004-152471 (Patent Document 3) discloses a FePt—C thin film of $L1_0$-based ordered alloys having a granular structure including FePt magnetic crystal grains and C-based non-magnetic grain boundaries, formed on a magnesium oxide (MgO) substrate using a sputtering method. Moreover, Japanese Patent Application Publication No. 2008-091009 (Patent Document 4) indicates that a thin film having a granular structure containing magnetic crystal grains of a $L1_0$-based ordered alloy (FePt or the like) is obtained according to a sputtering method which uses a substrate heated to 650° C. or higher. Further, Published Japanese Translation of PCT Application No. 2010-503139 (Patent Document 5) discloses a magnetic recording medium having a structure including a substrate, an underlayer, a buffer layer, and a magnetic recording layer, in which the underlayer has a lattice misfit of 3% to 10% with respect to the magnetic recording layer and the buffer layer has (002) orientation whereby the magnetic recording layer having a granular structure including magnetic crystal grains formed from a $L1_0$-based ordered alloy and non-magnetic grain boundaries formed from additives can be formed at a temperature lower than 400° C.

In the disclosed method of forming the thin film of $L1_0$-based ordered alloys, which utilizes the benefits of the lattice misfit of the underlayer and the orientation of the buffer layer, when a FePt material containing 15 vol % of C is deposited on a substrate heated to 350° C., a granular structure having FePt grains having an average size of 7 nm and C-based non-magnetic grain boundaries having a width (the gap between adjacent FePt grains) of 1 nm is obtained (see Patent Document 5). However, the present inventor has found that when a Cr-based underlayer having a thickness in the range of 5 nm to 60 nm and a buffer layer formed from MgO or Pt having a thickness in the range of 2 nm to 8 nm were used, the width of FePt magnetic crystal grains and C-based non-magnetic grain boundaries in the granular structure changed depending on the amount of C added to the FePt material, the substrate temperature, and the thickness of the thin alloy film to be formed. In order to improve magnetical decoupling of FePt magnetic crystal grains in the granular structure, it is effective to increase the substrate temperature and to increase the amount of C added. However, it was understood that an increase in the substrate temperature promoted coupling of adjacent FePt magnetic crystal grains to increase the grain size. Moreover, it was understood that an increase in the amount of C added resulted in a decrease in magnetization strength (Ms) (that is, a decrease in the strength of magnetic signals during reading) of the thin alloy film (the magnetic recording layer). On the other hand, in order to improve the magnetization strength (Ms) of the thin alloy film (the magnetic recording layer), it is effective to increase the thickness of the thin alloy film (the magnetic recording layer). However, it was understood that an increase in the thickness of the thin alloy film (the magnetic recording layer) resulted in an increase in the size of the FePt magnetic crystal grains in the granular structure. From the above, in the disclosed configuration, it was difficult to simultaneously realize a further decrease in the size of magnetic crystal grains, more satisfactory magnetical decoupling between the magnetic crystal grains, and higher magnetization strength (Ms) characteristics to thereby obtain satisfactory signal characteristics required for high-density magnetic recording.

The present invention has been made in view of the above-described problems and an object thereof is to provide a magnetic recording medium including a magnetic recording layer having a granular structure, capable of achieving satisfactory signal characteristics at high magnetic recording density.

SUMMARY OF THE INVENTION

This object is achieved by providing a perpendicular magnetic recording medium, comprising a non-magnetic substrate having a principle surface; an underlayer provided on the non-magnetic substrate that includes first and second underlayers; and a magnetic recording layer provided on the underlayer that includes a layer having a granular structure comprising grains of a magnetic crystal and grain boundary portions, wherein the first underlayer has a NaCl structure with a (001) orientation and contains a nitride or an oxide of at least one element; and wherein the second underlayer includes regions having a shape formed on the first underlayer.

A magnetic recording medium of a first embodiment of the present invention includes at least: a non-magnetic substrate; an underlayer provided on the non-magnetic substrate that includes first and second underlayers; and a magnetic recording layer provided on the underlayer that includes a layer having a granular structure comprising grains of a magnetic crystal and grain boundary portions, wherein the first underlayer has a NaCl structure with a (001) orientation and contains a nitride of at least one element selected from the group consisting of Cr, V, Ti, Sc, Mo, Nb, Zr, Y, Al, and B; and wherein the second underlayer includes a plurality of island-shaped regions formed on the first underlayer containing at least one element selected from the group consisting of Mg, Ca, Co, and Ni. Here, the magnetic crystal grains may contain a $L1_0$-based ordered alloy, such as a FePt alloy or a CoPt alloy. Moreover, the grain boundary portions may contain carbon or carbides. Further, it is preferable that the magnetic crystal grains have an axis of easy magnetization perpendicular to a principal surface of the non-magnetic substrate.

A magnetic recording medium of a second embodiment of the present invention includes at least: a non-magnetic substrate; an underlayer provided on the non-magnetic substrate that includes first and second underlayers; and a magnetic recording layer provided on the underlayer that includes a layer having a granular structure comprising grains of a magnetic crystal and grain boundary portions, wherein the first underlayer has a NaCl structure with a (001) orientation and contains an oxide of at least one element selected from the group consisting of Mg, Ca, Co, and Ni; and wherein the second underlayer includes net-shaped regions formed on the first underlayer containing at least one element selected from the group consisting of Cr, V, Ti, Sc, Mo, Nb, Zr, Y, Al, B, and C. Here, the magnetic crystal grains may contain a $L1_0$-based ordered alloy, such as a FePt alloy or a CoPt alloy. Moreover, the grain boundary portions may contain carbon or carbides. Further, it is preferable that the magnetic crystal grains have an axis of easy magnetization perpendicular to a principal surface of the non-magnetic substrate.

With the configurations described above, the present invention provides a magnetic recording medium having satisfactory signal characteristics at high recording density by reducing the size of magnetic crystal grains in the magnetic recording layer having the granular structure and magnetically separating the magnetic crystal grains.

DETAILED DESCRIPTION OF THE INVENTION

Figure 1:
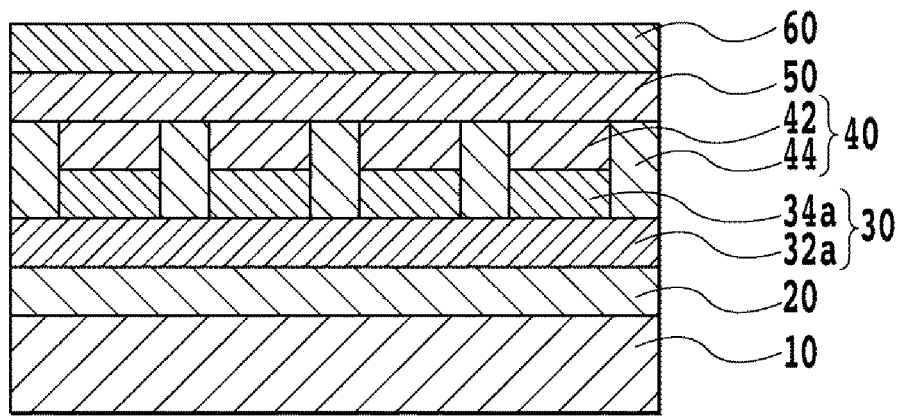
FIG. 1 is a schematic cross-sectional view of a magnetic recording medium according to a first embodiment of the present invention.

A magnetic recording medium of the first embodiment of the present invention includes at least: a non-magnetic substrate, an underlayer, and a magnetic recording layer on the underlayer, in which the underlayer includes: a first underlayer having a NaCl structure with a (001) orientation, containing a nitride of at least one element selected from the group consisting of Cr, V, Ti, Sc, Mo, Nb, Zr, Y, Al, and B; and a second underlayer formed on the first underlayer in an island shape, containing at least one element selected from the group consisting of Mg, Ca, Co, and Ni, and the magnetic recording layer has a granular structure including magnetic crystal grains and grain boundary portions. In the example illustrated in FIG. 1, the magnetic recording medium of the first embodiment of the present invention includes a non-magnetic substrate 10, a soft magnetic underlayer 20, an underlayer 30 including a first underlayer 32a and a second underlayer 34a, a magnetic recording layer 40 including magnetic crystal grains 42 and grain boundary portions 44, a protective layer 50, and a liquid lubricant layer 60. Here, the soft magnetic underlayer 20, the protective layer 50, and the liquid lubricant layer 60 are optional layers.

The non-magnetic substrate 10 has a smooth surface (principal surface). For example, a material of the non-magnetic substrate 10 includes optional materials such as NiP-plated Al alloy, reinforced glass, crystallized glass, or the like, which are known in the art.

The soft magnetic underlayer 20 which is an optional layer controls a magnetic flux from a magnetic head to improve read/write characteristics of a perpendicular magnetic recording medium. A material for forming the soft magnetic underlayer 20 includes crystalline materials such as a NiFe alloy, a sendust (FeSiAl) alloy, or a CoFe alloy, microcrystalline materials such as FeTaC, CoFeNi, or CoNiP, and amorphous materials including Co alloys such as CoZrNb or CoTaZr. An optimal thickness of the soft magnetic underlayer 20 depends on the structure and characteristics of a magnetic head used for magnetic recording. When the soft magnetic underlayer 20 is formed continuously with other layers, it is preferable that the soft magnetic underlayer has a thickness in the range of 10 nm and 500 nm (both ends inclusive) from the perspective of balance with productivity.

In order to secure adhesion between the soft magnetic underlayer 20 and the underlayer 30, an adhesion layer (not illustrated) may be optionally provided between these layers. A material for forming the adhesion layer includes metals such as Ni, W, Ta, Cr, or Ru and alloys containing such metals. The adhesion layer may be a single layer and may have a stacked structure including a plurality of layers.

The underlayer 30 of the present embodiment has a stacked structure including the first underlayer 32a and the second underlayer 34a. The thickness of the underlayer 30 is determined taking the durability desired for the underlayer 30, the crystalline property desired for the magnetic recording layer 40 (the magnetic crystal grains 42), and the read/write characteristics and productivity required by the perpendicular magnetic recording medium into consideration. Preferably, the underlayer 30 has a thickness in the range of 2 nm and 50 nm.

The first underlayer 32a has a NaCl structure with a (001) orientation. Moreover, a material for forming the first underlayer 32a includes a nitride of the group consisting of Cr, V, Ti, Sc, Mo, Nb, Zr, Y, Al, and B. The nitride of at least one element selected from the group consisting of Cr, V, Ti, Sc, Mo, Nb, Zr, Y, Al, and B is likely to have a NaCl crystal structure, and the surface energy to vacuum is as small as 0.2 J/m$^2$ to 0.6 J/m$^2$ and the interfacial energy with FePt is smaller than 0 J/m$^2$. The thickness of the first underlayer 32a is determined taking the durability desired for the first underlayer 32a, the crystalline property desired for the magnetic crystal grains 42, and the read/write characteristics and productivity required by the perpendicular magnetic recording medium into consideration. Preferably, the first underlayer 32a has a thickness in the range of 2 nm and 50 nm.

The second underlayer 34a is formed on the first underlayer 32a and includes a plurality of independent island-shaped regions. A material for forming the second underlayer 34a includes at least one element selected from the group consisting of Mg, Ca, Co, and Ni. Preferably, the material for forming the second underlayer 34a includes oxides or nitrides of such elements. More preferably, the material for forming the second underlayer 34a includes oxides of such elements. The oxides of such elements are likely to have a NaCl crystal structure, and the surface energy to vacuum is generally as large as 1.0 J/m$^2$ and the interfacial energy with FePt is larger than 0 J/m$^2$. The plurality of island-shaped regions that forms the second underlayer 34a has an average diameter of 3 nm to 10 nm. The respective island-shaped regions are decoupled from adjacent island-shaped regions by depletion regions having an average width of 0.1 nm to 3 nm. The depletion region is a region in which the first underlayer 32a is substantially exposed. An average thickness of the second underlayer 34a is determined taking surface roughness into consideration. Here, the average thickness of the second underlayer 34a means the thickness when deposited materials are uniformly distributed over the entire area of a film to be formed rather than the plurality of island-shaped regions. Preferably, the second underlayer 34a has an average thickness in the range of 0.1 nm and 2 nm.

Since the magnetic crystal grains 42 of the magnetic recording layer 40 are formed on the second underlayer 34a, which will be described later, it is preferable that the second underlayer 34a has a NaCl structure oriented in the (001) plane.

In a general thin film forming step, the plurality of island-shaped regions is formed in the initial stage of growth. In particular, when a thin-film material is less wettable to a layer thereunder and the surface energy of the thin-film material to vacuum is large, relatively thick island-shaped regions are formed. This is because the thin-film material will decrease its contact area with the layer thereunder and decrease its contact area with vacuum. Here, the initial stage of growth means the stage before the thin-film material covers the entire surface of the layer thereunder. Moreover, the properties that the thin-film material is less wettable to the layer thereunder means that the surface energy of the material of the layer thereunder to vacuum is smaller than the interfacial energy between the thin-film material and the material of the layer thereunder. Since the material (including a nitride of at least one element selected from the group consisting of Cr, V, Ti, Sc, Mo, Nb, Zr, Y, Al, and B) of the first underlayer 32a and the material (including at least one element selected from the group consisting of Mg, Ca, Co, and Ni) of the second underlayer 34a satisfy this relation, it is thought that formation of the island-shaped regions is accelerated.

The magnetic recording layer 40 includes columnar magnetic crystal grains 42 and grain boundary portions 44 and has a granular structure in which the magnetic crystal grains 42 are decoupled (surrounded) by the grain boundary portions 44. The respective magnetic crystal grains 42 mainly include a magnetic material and are magnetically decoupled from adjacent magnetic crystal grains by the grain boundary portions 44 formed from a non-magnetic material. In order to improve the recording density of a perpendicular magnetic recording medium, it is preferable that the magnetic crystal grains 42 are arranged at a small pitch. On the other hand, from the perspective of preventing thermal fluctuation and facilitating reading characteristics of recorded signals (magnetizations), it is preferable that the magnetic crystal grains 42 themselves have a large size. Thus, it is preferable that the grain boundary portions 44 have as small a width as possible as long as the magnetic crystal grains 42 can be magnetically decoupled. In the present invention, it is preferable that the magnetic crystal grains 42 have a diameter of 3 nm to 10 nm and the grain boundary portions have a width of 0.1 nm to 3 nm.

In the present invention, the magnetic crystal grains 42 have an axis of easy magnetization in a direction perpendicular to a principal surface (a principal surface of the perpendicular magnetic recording medium) of the non-magnetic substrate 10. Preferably, the magnetic crystal grains 42 are formed from a $L1_0$-based ordered alloy. The $L1_0$-based ordered alloy that can be used includes a CoPt alloy, a FePt alloy, or alloys in which Ni or Cu is added to these alloys.

On the other hand, it is preferable that the grain boundary portions 44 are formed from a material that is less soluble in the magnetic crystal grains 42. A material that can be used includes an oxide material, a carbon-based material, and a mixture of the oxide material and the carbon-based material. The oxide material that can be used includes $SiO_2$, $TiO_2$, MgO, and the like. The carbon-based material that can be used includes carbon, $B_4C$, BC, SiC, and the like.

In the present embodiment, the magnetic crystal grains 42 of the magnetic recording layer 40 are positioned on the second underlayer 34a. That is, the magnetic crystal grains 42 are formed on the plurality of independent island-shaped regions that forms the second underlayer 34a. On the other hand, the grain boundary portions 44 of the magnetic recording layer 40 are positioned in the depletion regions of the second underlayer 34a and are formed on the first underlayer 32a. This is because the interfacial energy between the material of the grain boundary portions 44 and the material of the first underlayer 32a (positioned in the depletion region of the second underlayer 34a) is smaller than the interfacial energy between the material of the grain boundary portions 44 and the material of the second underlayer 34a. In this way, by controlling the structure of the underlayer 30, it is possible to control the structure of the magnetic recording layer 40 and to obtain the magnetic recording layer 40 having excellent characteristics. Here, the structure of the underlayer 30 can be controlled by forming the second underlayer 34a including a plurality of independent island-shaped regions. Moreover, the structure of the magnetic recording layer 40 to be controlled includes an arrangement of the magnetic crystal grains and the grain boundary portions, the size of the magnetic crystal grains, and the width of the grain boundary portions.

Alternatively, the magnetic recording layer 40 may have a stacked structure including a plurality of magnetic material layers. In this case, an exchange coupling control layer may be disposed between the respective magnetic material layers to form an exchange coupled composite (ECC) structure which functions as one magnetic recording layer. In the present invention, at least the magnetic material layer in contact with the underlayer 30 among the plurality of magnetic material layers has a granular structure. An ECC structure may be formed using two or more magnetic material layers having the granular structure. When two or more magnetic material layers having the granular structure are used, it is preferable that the magnetic crystal grains 42 and the grain boundary portions 44 are arranged so as to overlap respectively in a direction perpendicular to the principal surface of the non-magnetic substrate 10. With this arrangement, the magnetic crystal grains 42 of the respective magnetic material layers are coupled with the exchange coupling control layer interposed and are decoupled by the non-magnetic grain boundary portions 44, and an independent flux reversal unit that passes through the plurality of magnetic material layers is formed.

The thickness of the magnetic recording layer 40 is determined taking the read/write characteristics required for the perpendicular magnetic recording medium into consideration. In general, the magnetic recording layer 40 has a thickness in the range of 5 nm to 50 nm (both ends inclusive).

The protective layer 50 can be formed using an optional material known in the art, such as a material mainly composed of carbon. The protective layer may be a single layer and may have a stacked structure. The protective layer 50 having a stacked structure can be formed using a combination of two kinds of carbon materials having different properties, a combination of metal and a carbon material, or a combination of an oxide and a carbon material, for example.

The liquid lubricant layer 60 can be formed using an optional lubricant known in the art, such as a perfluoropolyether-based lubricant.

The respective layers stacked on the non-magnetic substrate 10 can be formed using an optional technique known in the technical field of magnetic recording media. The soft magnetic underlayer 20, the adhesion layer, the underlayer 30, the magnetic recording layer 40, and the protective layer 50 can be formed using techniques such as a sputtering method (for example, a DC magnetron sputtering method or an RF sputtering method), a vacuum deposition method, or a CVD method. Moreover, the liquid lubricant layer 60 can be formed using a coating method such as a dip method or a spin coating method. Moreover, the magnetic recording layer 40 including the $L1_0$-based ordered alloy is generally formed using a sputtering method (for example, a DC magnetron sputtering method or an RF sputtering method) that involves heating of a substrate. However, the method of forming the respective constituent layers is not limited to the technique described above.

Figure 2:
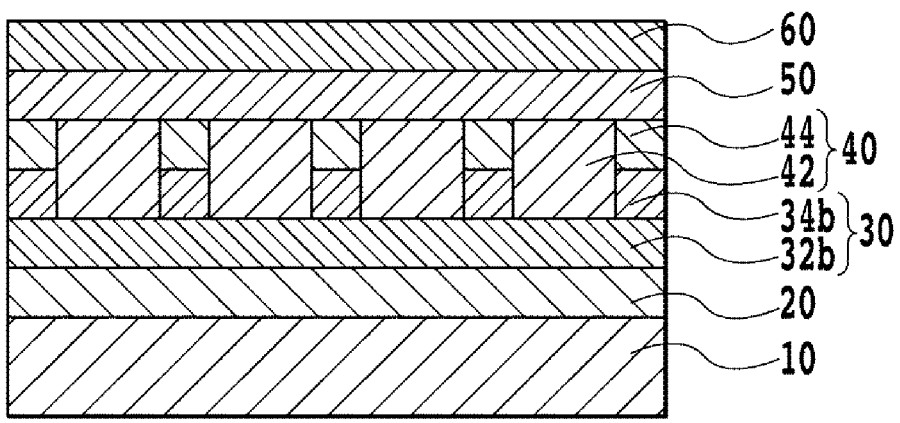
FIG. 2 is a schematic cross-sectional view of a magnetic recording medium according to a second embodiment of the present invention.

A magnetic recording medium of a second embodiment of the present invention includes at least: a non-magnetic substrate, an underlayer, and a magnetic recording layer on the underlayer, wherein the underlayer includes: a first underlayer having a NaCl structure with a (001) orientation, containing an oxide of at least one element selected from the group consisting of Mg, Ca, Co, and Ni; and a second underlayer including net-shaped regions formed on the first underlayer, containing at least one element selected from the group consisting of Cr, V, Ti, Sc, Mo, Nb, Zr, Y, Al, B, and C, and the magnetic recording layer includes a layer having a granular structure including magnetic crystal grains and grain boundary portions. In the example illustrated in FIG. 2, the magnetic recording medium of the second embodiment of the present invention includes a non-magnetic substrate 10, a soft magnetic underlayer 20, an underlayer 30 including a first underlayer 32b and a second underlayer 34b, a magnetic recording layer 40 including magnetic crystal grains 42 and grain boundary portions 44, a protective layer 50, and a liquid lubricant layer 60. Here, the soft magnetic underlayer 20, the protective layer 50, and the liquid lubricant layer 60 are optional layers.

The non-magnetic substrate 10, the soft magnetic underlayer 20, the adhesion layer, the protective layer 50, and the liquid lubricant layer 60 of the present embodiment are the same as the respective constituent components described in the first embodiment.

The underlayer 30 of the present embodiment has a stacked structure including the first underlayer 32b and the second underlayer 34b. The thickness of the underlayer 30 is determined taking the durability desired for the underlayer 30, the crystalline property desired for the magnetic crystal grains 42, and the read/write characteristics and productivity required by the perpendicular magnetic recording medium into consideration. Preferably, the underlayer 30 has a thickness in the range of 2 nm and 50 nm.

The first underlayer 32b has a NaCl structure with a (001) orientation. Moreover, a material for forming the first underlayer 32b includes an oxide of at least one element selected from the group consisting of Mg, Ca, Co, and Ni. The thickness of the first underlayer 32b is determined taking the durability desired for the first underlayer 32b, the crystalline property desired for the magnetic recording layer 40, and the read/write characteristics and productivity required by the perpendicular magnetic recording medium into consideration. Preferably, the first underlayer 32b has a thickness in the range of 2 nm and 50 nm.

The second underlayer 34b is formed on the first underlayer 32a and includes net-shaped regions. A material for forming the second underlayer 34b includes at least one element selected from the group consisting of Cr, V, Ti, Sc, Mo, Nb, Zr, Y, Al, and B. Preferably, the material for forming the second underlayer 34b includes oxides or nitrides of such elements. More preferably, the material for forming the second underlayer 34b includes nitrides of such elements. The net-shaped regions that form the second underlayer 34b have an average diameter of 0.1 nm to 3 nm. The net-shaped regions surround a plurality of depletion regions having an average diameter of 3 nm to 10 nm. An average thickness of the second underlayer 34b is determined taking surface roughness into consideration. Here, the average thickness of the second underlayer 34b means the thickness when deposited materials are uniformly distributed over the entire area of a film to be formed rather than the net-shaped regions. Preferably, the second underlayer 34b has an average thickness in the range of 0.1 nm and 2 nm.

When forming the net-shaped regions, it is important that a thin-film material is less wettable to a layer thereunder and the surface energy of the thin-film material to vacuum is small. Here, the properties that the thin-film material is less wettable to the layer thereunder means that the surface energy of the material of the layer thereunder to vacuum is smaller than the interfacial energy between the thin-film material and the material of the layer thereunder. This is because the thin-film material will decrease its contact area with the layer thereunder and increase its contact area with vacuum. Since the material (an oxide of at least one element selected from the group consisting of Mg, Ca, Co, and Ni) of the first underlayer 32b and the material (including at least one element selected from the group consisting of Cr, V, Ti, Sc, Mo, Nb, Zr, Y, Al, and B) of the second underlayer 34b satisfy this relation, it is thought that formation of the net-shaped regions is accelerated.

The magnetic recording layer 40 of the present embodiment is the same as the magnetic recording layer 40 of the first embodiment except that the magnetic crystal grains 42 are formed in the depletion region (that is, an exposed region of the first underlayer 32b) of the second underlayer 34b and the grain boundary portions 44 are formed on the second underlayer 34b which is the net-shaped regions. The first underlayer 32b, the second underlayer 34b, the magnetic crystal grains 42, and the grain boundary portions 44 are in such a positional relation because the interfacial energy between the material of the grain boundary portions 44 and the material of the second underlayer 34b is smaller than the interfacial energy between the material of the grain boundary portions 44 and the material of the first underlayer 32b (positioned in the depletion region of the second underlayer 34b). In this way, by controlling the structure of the underlayer 30, it is possible to control the structure of the magnetic recording layer 40 and to obtain the magnetic recording layer 40 having excellent characteristics. Here, the structure of the underlayer 30 can be controlled by forming the second underlayer 34b including the net-shaped regions. Moreover, the structure of the magnetic recording layer 40 to be controlled includes an arrangement of the magnetic crystal grains and the grain boundary portions, the size of the magnetic crystal grains, and the width of the grain boundary portions.

EXAMPLES

Example 1

In this example, the perpendicular magnetic recording medium of the first embodiment of the present invention including a non-magnetic substrate 10 formed from a chemically reinforced glass, a CoZrNb soft magnetic underlayer 20, a NiCrMo adhesion layer, an underlayer 30 including a first TiN underlayer 32a and a second MgO underlayer 34a including a plurality of island-shaped regions, a FePt—C magnetic recording layer 40 having a granular structure including magnetic crystal grains 42 formed from a FePt-ordered alloy and C-based non-magnetic portions 44, a C-based protective layer 50, and a liquid lubricant layer 60 in that order was manufactured.

In this example, the layers ranging from the CoZrNb soft magnetic underlayer 20 to the C-based protective layer 50 were formed inside an in-line type film forming apparatus without exposing the layers to the air.

First, a chemically reinforced glass substrate having a flat surface (N-glass substrate manufactured by HOYA Corporation, inner diameter: ϕ 20 mm, and outer diameter: ϕ 65 mm) was washed and a non-magnetic substrate 10 was prepared. The non-magnetic substrate 10 was introduced into a sputtering apparatus and an amorphous CoZrNb soft magnetic underlayer 20 having a thickness of 40 nm was formed in an Ar gas atmosphere according to a DC magnetron sputtering method which used a CoZrNb target. Subsequently, a NiCrMo adhesion layer having a thickness of 5 nm was formed according to a DC magnetron sputtering method which used a NiCrMo target.

Subsequently, a stacked structure having the adhesion layer formed thereon was heated to 200° C. and a first TiN underlayer 32a having a thickness of 10 nm was formed according to a DC magnetron sputtering method which used a TiN target. This step was performed by applying DC power of 200 W in an Ar gas atmosphere under pressure of 0.3 Pa.

Subsequently, while heating the stacked structure having the first underlayer 32a formed thereon to 200° C., a second MgO underlayer 34a was formed according to an RF sputtering method which used a MgO target. This step was performed by applying RF power of 200 W and a substrate bias of 500 V for three seconds in an Ar gas atmosphere under pressure of 0.8 Pa. An MgO film was separately formed under the same conditions and the deposition speed measured was 10 nm/min. Thus, the second MgO underlayer 34a formed in this step had an average thickness of 0.5 nm.

Subsequently, the stacked structure having the second underlayer 34a formed thereon was heated to a temperature ranging between 200° C. to 400° C. respectively and a Fe$_{50}$Pt$_{50}$-C magnetic recording layer 40 was formed according to a DC magnetron sputtering method which uses an Fe$_{50}$Pt$_{50}$-C target containing C by 25 vol % based on Fe$_{50}$Pt$_{50}$. This step was performed by applying DC power of 600 W and a substrate bias of 0 V for 2.0 seconds in an Ar gas atmosphere under pressure of 1.5 Pa. A Fe$_{50}$Pt$_{50}$-C film was separately formed under the same conditions and the deposition speed measured was 7 nm/sec. Thus, the Fe$_{50}$Pt$_{50}$-C magnetic recording layer 40 formed in this step had an average thickness of 14 nm. Here, the average thickness means the thickness when deposited materials are uniformly distributed over the entire area of a film to be formed.

Subsequently, a C-based protective layer 50 having a thickness of 3 nm was formed on the stacked structure having the magnetic recording layer 40 according to a sputtering method which used a carbon target. After the protective layer 50 was formed, the stacked structure obtained was taken out of the film forming apparatus.

Finally, a liquid lubricant layer 60 formed from perfluoropolyether and having a thickness of 2 nm was formed on the stacked structure using a dip method to obtain a perpendicular magnetic recording medium.

Example 2

In this example, the perpendicular magnetic recording medium of the second embodiment of the present invention including a non-magnetic substrate 10 formed from a chemically reinforced glass, a CoZrNb soft magnetic underlayer 20, a NiCrMo adhesion layer, an underlayer 30 including a first MgO underlayer 32b and a second TiN underlayer 34b including net-shaped regions, a FePt—C magnetic recording layer 40 having a granular structure including magnetic crystal grains 42 formed from a FePt-ordered alloy and C-based non-magnetic portions 44, a C-based protective layer 50, and a liquid lubricant layer 60 in that order was manufactured.

Similarly to Example 1, the layers ranging from the CoZrNb soft magnetic underlayer 20 to the C-based protective layer 50 were formed using an in-line type film forming apparatus without exposing the layers to the air. First, the CoZrNb soft magnetic underlayer 20 and the NiCrMo adhesion layer were formed according to the same order as Example 1.

Subsequently, the stacked structure having the adhesion layer formed thereon was heated to 200° C. and a first MgO underlayer 32b having a thickness of 8 nm was formed according to an RF sputtering method which used a MgO target. This step was performed by applying RF power of 330 W and a substrate bias of 500 V in an Ar gas atmosphere under pressure of 0.2 Pa.

Subsequently, while heating the stacked structure having the first underlayer 32b formed thereon to 200° C., a second TiN underlayer 34b was formed according to a DC magnetron sputtering method which used a TiN target. This step was performed by applying DC power of 250 W for 0.5 seconds in an Ar gas atmosphere under pressure of 0.4 Pa. A TiN film was separately formed under the same conditions and the deposition speed measured was 40 nm/min. Thus, the second TiN underlayer 34b formed in this step had an average thickness of 0.3 nm.

After that, the Fe$_{50}$Pt$_{50}$-C magnetic recording layer 40, the C-based protective layer 50, and the liquid lubricant layer 60 were formed according to the same order as Example 1 to obtain a perpendicular magnetic recording medium.

Comparative Example 1

In this comparative example, a perpendicular magnetic recording medium which does not fall within the scope of the present invention and in which an underlayer includes a single TiN layer was manufactured. The constituent layers other than the underlayer, of the perpendicular magnetic recording medium of this comparative example are the same as those of the perpendicular magnetic recording medium of Example 1.

The layers ranging from the CoZrNb soft magnetic underlayer to the C-based protective layer were formed using an in-line type film forming apparatus without exposing the layers to the air similarly to Example 1. First, a CoZrNb soft magnetic underlayer and a NiCrMo adhesion layer were formed according to the same order as Example 1.

Subsequently, the stacked structure having the adhesion layer formed thereon was heated to 200° C. and a TiN underlayer having a thickness of 10 nm was formed according to a DC magnetron sputtering method which used a TiN target. This step was performed by applying DC power of 200 W in an Ar gas atmosphere under pressure of 0.3 Pa.

After that, a Fe$_{50}$Pt$_{50}$-C magnetic recording layer, a C-based protective layer, and a liquid lubricant layer were formed according to the same order as Example 1 to obtain a perpendicular magnetic recording medium.

Comparative Example 2

In this comparative example, a perpendicular magnetic recording medium which does not fall within the scope of the present invention and in which an underlayer includes a single MgO layer was manufactured. The constituent layers other than the underlayer, of the perpendicular magnetic recording medium of this comparative example are the same as those of the perpendicular magnetic recording medium of Example 1.

The layers ranging from the CoZrNb soft magnetic underlayer to the C-based protective layer were formed using an in-line type film forming apparatus without exposing the layers to the air similarly to Example 1. First, a CoZrNb soft magnetic underlayer and a NiCrMo adhesion layer were formed according to the same order as Example 1.

Subsequently, the stacked structure having the adhesion layer formed thereon was heated to 200° C. and a MgO underlayer having a thickness of 8 nm was formed according to an RF sputtering method which used a MgO target. This step was performed by applying RF power of 330 W and a substrate bias of 500 V in an Ar gas atmosphere under pressure of 0.2 Pa.

After that, an Fe$_{50}$Pt$_{50}$-C magnetic recording layer, a C-based protective layer, and a liquid lubricant layer were formed according to the same order as Example 1 to obtain a perpendicular magnetic recording medium.

Figure 3:
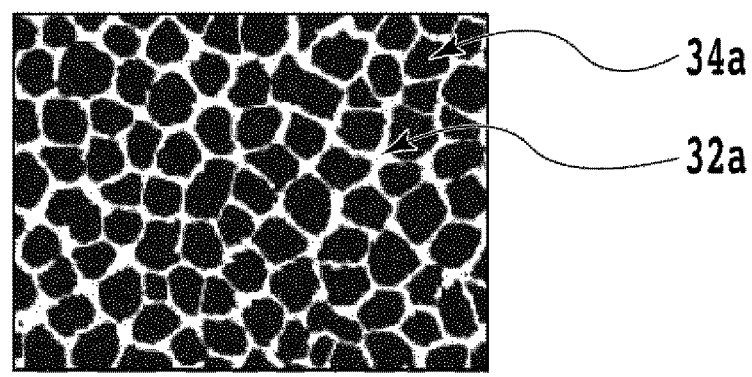
FIG. 3 is a diagram illustrating element mapping of Mg on the surface of an underlayer formed in Example 1.

Evaluation—(A) Underlayer Composition Analysis:

In Examples 1 and 2, samples in which an underlayer had been formed and the C-based protective layer had been formed without forming the magnetic recording layer were picked out and the composition of the underlayer was analyzed. The composition was analyzed according to an ion milling method in which samples were sliced from a glass substrate so as to include a portion having a thickness of 10 nm or smaller to obtain thin sheets, and the thin sheets were observed with a magnification of $10^6$ using an energy-dispersive X-ray analyzer (EDX) included in a field-emission transmission electron microscope (FE-TEM) to obtain element mappings of Mg, O, Ti, and N. The element mapping of Mg of the sample of Example 1 is illustrated in FIG. 3. The element mapping of Ti of the sample of Example 2 is illustrated in FIG. 4.

The element mapping of Mg of the sample of Example 1 illustrated in FIG. 3 included a plurality of island-shaped regions (gray portions in FIG. 3) containing the element Mg and inter-island depletion regions (white portions in FIG. 3) that did not contain the element Mg. Moreover, the respective island-shaped regions were independent from the adjacent island-shaped regions due to the inter-island depletion regions. Further, it was understood from the element mapping of O that the distribution of the element O was identical to the element mapping of Mg. From this fact, it was confirmed that the second underlayer 34*a* including a plurality of MgO island-shaped regions was dispersed over the surface of the first underlayer 32*a*. Moreover, the average pitch of the plurality of island-shaped regions was 6 nm. Here, the pitch of the island-shaped regions means a distance between the gravity center positions of adjacent two island-shaped regions.

Figure 4:
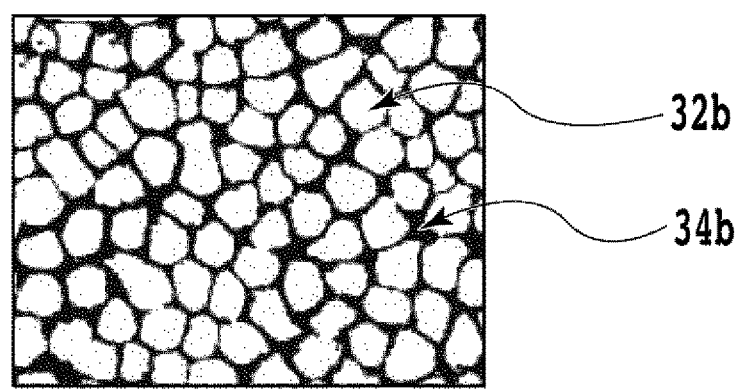
FIG. 4 is a diagram illustrating element mapping of Ti on the surface of an underlayer formed in Example 2.

The element mapping of Ti of the sample of Example 2 illustrated in FIG. 4 included net-shaped regions (gray portions in FIG. 4) containing the element Ti and a plurality of depletion regions (white portions in FIG. 4) that did not contain the element Ti. Moreover, the respective depletion regions were independent from the adjacent depletion regions due to the net-shaped regions. Further, it was understood from the element mapping of N that the distribution of the element N was identical to the element mapping of Ti. From this fact, it was confirmed that the second underlayer 34*b* including the TiN net-shaped regions was spread over the surface of the first underlayer 32*b*. Moreover, the average pitch of the plurality of depletion regions was 6.5 nm. Here, the pitch of the depletion regions means a distance between the gravity center positions of adjacent two depletion regions.

Evaluation—(B) Analysis of Microstructure of Magnetic Recording layer

In Examples 1 and 2 and Comparative Examples 1 and 2, samples in which the C-based protective layer had been formed were picked out and the microstructure of the magnetic recording layer was analyzed. The microstructure was analyzed according to an ion milling method in which samples were sliced from a glass substrate so as to include a portion having a thickness of 10 nm or smaller to obtain thin sheets, and the thin sheets were analyzed using a field-emission transmission electron microscope (FE-TEM).

Figure 5:
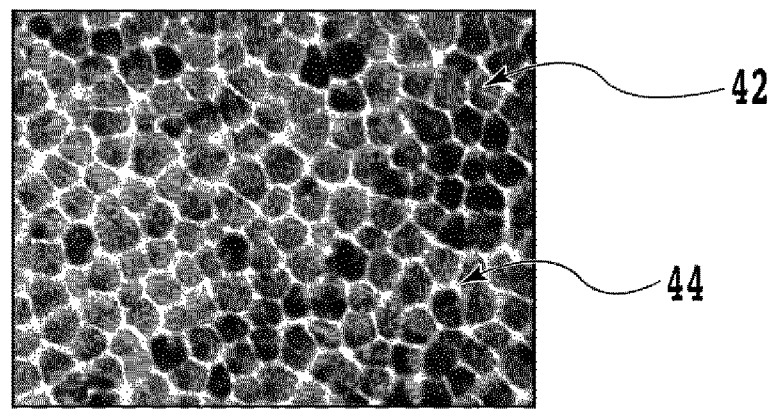
FIG. 5 is a TEM image of a magnetic recording layer formed at a heating temperature of 400° C. in Example 1.

FIG. 5 illustrates a bright field image of the TEM image of the magnetic recording layer of the sample of Example 1 in which the stacked structure was heated to 400° C. to form the magnetic recording layer. In FIG. 5, a granular structure including the magnetic crystal grains 42 (gray portions in FIG. 5) and the grain boundary portions 44 (white portions in FIG. 5) was clearly observed. In all samples of Examples 1 and 2 in which the magnetic recording layer was formed under different conditions of heating temperature, a clear granular structure as in FIG. 5 was observed.

Figure 6:
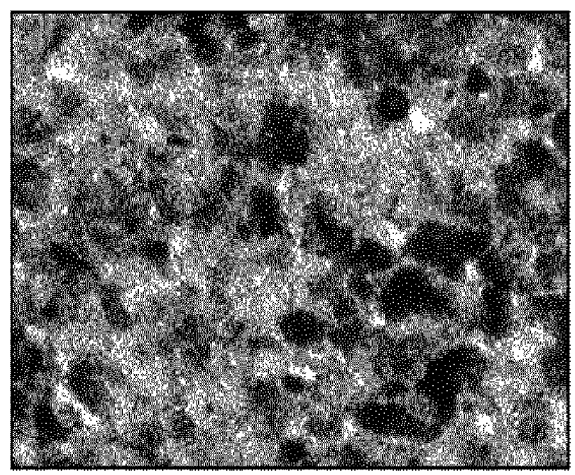
FIG. 6 is a TEM image of a magnetic recording layer formed at a heating temperature of 400° C. in Comparative Example 1.

FIG. 6 illustrates a bright field image of the TEM image of the magnetic recording layer of the sample of Comparative Example 1 in which the stacked structure was heated to 400° C. to form the magnetic recording layer. In FIG. 6, the boundaries of magnetic crystal grains were present in spots. However, all boundaries were not clear. In all samples of Comparative Example 1 in which the magnetic recording layer was formed under different conditions of heating temperature, it was observed that the boundaries of magnetic crystal grains were unclear but present in spots. From this fact, in Comparative Example 1, it was confirmed that the magnetic crystal grains were not magnetically decoupled.

Figure 7:
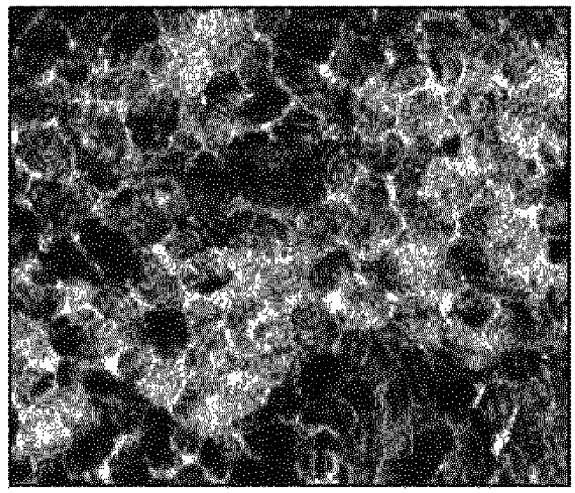
FIG. 7 is a TEM image of a magnetic recording layer formed at a heating temperature of 300° C. in Comparative Example 1.
Figure 8:
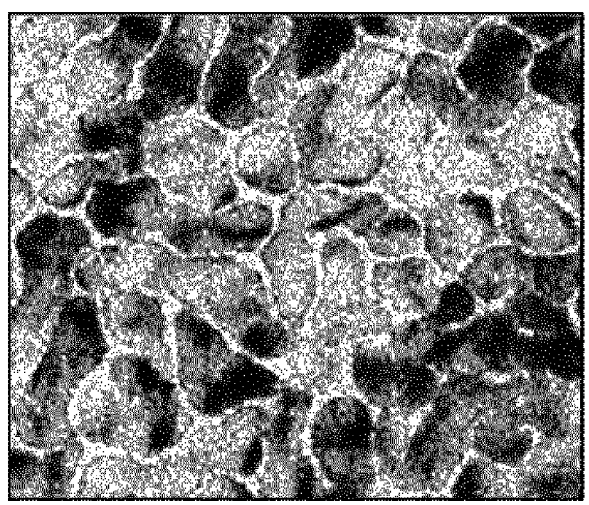
FIG. 8 is a TEM image of a magnetic recording layer formed at a heating temperature of 400° C. in Comparative Example 2.

FIG. 7 illustrates a bright field image of the TEM image of the magnetic recording layer of the sample of Comparative Example 2 in which the stacked structure was heated to 300° C. to form the magnetic recording layer. In FIG. 7, the boundaries of magnetic crystal grains were present in spots. However, a number of portions having unclear boundaries were observed. FIG. 8 illustrates a bright field image of the TEM image of the magnetic recording layer of the sample of Comparative Example 2 in which the stacked structure was heated to 400° C. to form the magnetic recording layer. In FIG. 8, the boundaries of magnetic crystal grains were clearly present. However, it was observed that adjacent magnetic crystal grains were in contact with each other to form large magnetic grains. From these facts, in Comparative Example 2, it was confirmed that the magnetic crystal grains could not be magnetically decoupled when the magnetic recording layer was formed at 300° C. or lower and that large magnetic grains were formed and recording density could not be improved when the magnetic recording layer was formed at 400° C.

Evaluation—(C) Measurement of Size and Boundary Width of Magnetic Crystal Grains of Magnetic Recording Layer The FE-TEM dark field image with a magnification of $7 \times 10^5$ was measured according to the same procedure as Evaluation (B). The obtained dark field image was analyzed using an image analyzer (Luzex-FS manufactured by Nireko Corporation) to measure the size and the boundary width of FePt magnetic crystal grains. The measurement results are illustrated in Table 1.

In Example 1, even when the heating temperature was changed from 200° C. to 400° C. during the formation of the magnetic recording layer, the FePt magnetic crystal grains had a stable size in the range of 5.2 nm to 5.5 nm and a stable boundary width in the range of 0.7 nm to 0.8 nm. As a result, this agrees with a feature, as described in Evaluation (A), in which the second MgO underlayer 34*a* of Example 1 included a plurality of island-shaped regions and the average pitch of the island-shaped regions was 6 nm. From this fact, it was considered that the FePt magnetic crystal grains 42 of the magnetic recording layer were selectively formed on the surface of the plurality of island-shaped regions of the second MgO underlayer 34*a* and the grain boundary portions 44 were selectively formed in the depletion regions of the second MgO underlayer 34*a* (that is, on the exposed surface of the first TiN underlayer 32*a*).

In Example 2, even when the heating temperature was changed from 200° C. to 400° C. during the formation of the magnetic recording layer, the FePt magnetic crystal grains had a stable size in the range of 5.7 nm to 5.9 nm and a stable boundary width in the range of 0.8 nm to 1.0 nm. As a result, this agrees with a feature, as described in Evaluation (A), in which the second TiN underlayer 34*b* of Example 2 included the net-shaped regions and the average pitch of the depletion regions was 6.5 nm. From this fact, it was considered that the FePt magnetic crystal grains 42 of the magnetic recording layer were selectively formed in the depletion regions of the second TiN underlayer 34*b* (that is, on the exposed surface of the first MgO underlayer 32*b*) and the grain boundary portions 44 were selectively formed on the surface of the second TiN underlayer 34*b* including the net-shaped regions.

On the other hand, in Comparative Example 1, the magnetic crystal grains were not decoupled and the grain size and the boundary width could not be measured. From this fact, it was considered that decoupling between magnetic crystal grains and grain boundary portions did not progress smoothly on the surface of the underlayer formed from TiN only and the granular structure could not be obtained.

Further, in Comparative Example 2, it was understood that, although the size of the magnetic crystal grains was small when the heating temperature was in the range of 300° C. or lower during the formation of the magnetic recording layer, the boundary width was small and the magnetic crystal grains were partially not decoupled magnetically. Moreover, when the heating temperature was increased to 400° C. during the formation of the magnetic recording layer, decoupling of magnetic crystal grains progressed. However, at the same time, coupling of adjacent magnetic crystal grains progressed also and large magnetic grains having a large size were obtained. From these facts, it was confirmed that a desirable granular structure in which magnetic crystal grains having an appropriate size and grain boundary portions having an appropriate boundary width were clearly decoupled was not obtained on the surface of the underlayer formed from MgO only.

Evaluation—(D) Analysis of Crystal Structure of Magnetic Recording Layer

In Examples 1 and 2 and Comparative Examples 1 and 2, samples in which the C-based protective layer had been formed were picked out and the crystal structure of the magnetic recording layer was analyzed. The crystal structure was analyzed using an X-ray analyzer and the degree of $L1_0$ order S was obtained based on the analysis results. The degree of $L1_0$ order S was calculated from the ratio of the following expressions wherein a theoretical diffraction intensity of the (001) plane and (002) plane of a FePt crystal is $[I(001)/I(002)]_T$ and a diffraction intensity of the sample measured by the X-ray analyzer is $[I(001)/I(002)]_M$.

$$S^2=[I(001)/I(002)]_M/[I(001)/I(002)]_T$$

The result showed that the perpendicular magnetic recording media of Examples 1 and 2 had a degree of order S of 70% or higher even when the temperature was changed in the range of 200° C. to 400° C. during the formation of the magnetic recording layer. From this fact, it was confirmed that the magnetic crystal grains of the perpendicular magnetic recording media of Examples 1 and 2 were $L1_0$-based ordered alloys having a high degree of order.

Evaluation—(E) SNR Characteristics of Perpendicular Magnetic Recording Medium

The signal-to-noise ratio (SNR) of read-write signals was measured using a commercial spin stand. The obtained perpendicular magnetic recording medium was rotated at a rotation speed of 5400 rpm, a signal having a frequency of 360 MHz was recorded in a portion corresponding to the radius R=19 mm using a TMR head, and read the signal, whereby the SNR was measured. The SNR (dB) was calculated from the obtained signal and noise outputs using the following equation.

SNR(dB)=10×log(Signal Output/Noise Output)

The results are illustrated in Table 1.

It was understood that the perpendicular magnetic recording media of Examples 1 and 2 had the SNR of 10 dB or higher and satisfactory read-write characteristics even when the temperature was changed in the range of 200° C. to 400° C. during the formation of the magnetic recording layer. The results could lead to the consideration that in the perpendicular magnetic recording media of the first and second embodiments of the present invention, the magnetic recording layer 40 having a granular structure in which the magnetic crystal grains 42 and the grain boundary portions 44 are satisfactorily decoupled was obtained.

On the other hand, the perpendicular magnetic recording medium of Comparative Example 1 showed the SNR smaller than 1 dB at any temperature applied to the formation of the magnetic recording layer. It is considered that this results from the fact that decoupling between magnetic crystal grains and grain boundary portions did not progress and the magnetic recording layer having the granular structure was not obtained.

Further, the perpendicular magnetic recording medium of Comparative Example 2 showed the SNR smaller than 1 dB when the temperature was 200° C. during the formation of the magnetic recording layer. The results could lead to the consideration that decoupling between magnetic crystal grains and grain boundary portions did not progress and the magnetic recording layer having the granular structure was not obtained. Moreover, when the temperature was in the range of 250° C. to 300° C. during the formation of the magnetic recording layer, the perpendicular magnetic recording medium of Comparative Example 2 showed the SNR smaller than 10 dB. It is considered that this results from the fact that a part of the magnetic crystal grains was not decoupled. Further, even when the temperature was 400° C. during the formation of the magnetic recording layer, the perpendicular magnetic recording medium of Comparative Example 2 showed the SNR smaller than 10 dB. It is considered that this results from the fact that, although magnetic crystal grains were decoupled by grain boundary portions, the magnetic crystal grains became large.

TABLE 1

Grain size and boundary width of magnetic crystal grains and SNR of perpendicular magnetic recording medium

| Sample | Heating temperature when forming magnetic recording layer (° C.) | FePt magnetic crystal grain | | SNR characteristics at 800 kFCI (dB) |
|---|---|---|---|---|
| | | Grain size (nm) | Boundary width (nm) | |
| Example 1 | 200 | 5.2 | 0.8 | 10.2 |
| | 250 | 5.4 | 0.8 | 10.8 |
| | 300 | 5.2 | 0.8 | 11.5 |
| | 400 | 5.5 | 0.7 | 11.7 |
| Example 2 | 200 | 5.8 | 0.8 | 10.3 |
| | 250 | 5.7 | 0.9 | 10.5 |
| | 300 | 5.9 | 1.0 | 11.4 |
| | 400 | 5.7 | 0.9 | 11.6 |
| Comparative Example 1 | 200 | — *1) | — *1) | <1 *2) |
| | 250 | — *1) | — *1) | <1 *2) |
| | 300 | — *1) | — *1) | <1 *2) |
| | 400 | — *1) | — *1) | <1 *2) |
| Comparative Example 2 | 200 | 5.8 | 0.3 | <1 *2) |
| | 250 | 6.5 | 0.4 | 4.2 |
| | 300 | 7.2 | 0.9 | 6.3 |
| | 400 | 25.3 | 3.4 | 5.2 |

*1) Magnetic crystal grains were not separated.
*2) Smaller than 1 dB

As described above, the present invention uses the underlayer that includes the second underlayer 34a having a plurality of island-shaped regions according to the first embodiment or the underlayer that includes the second underlayer 34b having the net-shaped regions according to the second embodiment. By doing so, it is possible to form a granular structure even when the temperature during the formation of the magnetic recording layer is relatively as low as 200° C. It is also possible to prevent the magnetic crystal grains in the granular structure from becoming large even when the temperature during the formation of the magnetic recording layer is increased to 400° C. As a result, the present invention can provide a perpendicular magnetic recording medium having satisfactory signal characteristics.

What is claimed is:

1. A perpendicular magnetic recording medium, comprising:
    a non-magnetic substrate having a principle surface;
    an underlayer provided on the non-magnetic substrate that includes first and second underlayers, the second underlayer formed on the first underlayer, the first underlayer containing a nitride of at least one element selected from the group consisting of Cr, V, Ti, Sc, Mo, Nb, Zr, Y, Al, and B, and the second underlayer containing at least one element selected from the group consisting of Mg, Ca, Co, and Ni; and
    a magnetic recording layer provided on the underlayer, the magnetic recording layer including a first layer having a granular structure comprising grains of a magnetic crystal and grain boundary portions, the grain boundary portions of the magnetic recording layer contacting the first underlayer,
    wherein the grain boundary portions contain a material selected from a group consisting of carbon and carbide,
    wherein the first underlayer has a NaCl structure with a (001) orientation,
    wherein the second underlayer includes regions having a shape formed on the first underlayer, and
    wherein the regions having a shape comprise a plurality of island-shaped regions.

2. The perpendicular magnetic recording medium according to claim 1, wherein the grains of a magnetic crystal contain a $L1_0$-based ordered alloy.

3. The perpendicular magnetic recording medium according to claim 1, wherein grains of a magnetic crystal contain a FePt alloy or a CoPt alloy.

4. The perpendicular magnetic recording medium according to claim 1, wherein the grains of a magnetic crystal have an axis of easy magnetization perpendicular to the principal surface of the non-magnetic substrate.

5. A perpendicular magnetic recording medium comprising:
    a non-magnetic substrate having a principal surface;
    an underlayer provided on the non-magnetic substrate, the underlayer
    including first and second underlayers, the second underlayer formed on the first underlayer, the first underlayer containing an oxide of at least one element selected from the group consisting of Mg, Ca, Co, and Ni, and the second underlayer containing at least one element selected from the group consisting of Cr, V, Ti, Sc, Mo, Nb, Zr, Y, Al, and B; and
    a magnetic recording layer provided on the underlayer, the magnetic recording layer including a first layer having a granular structure comprising grains of a magnetic crystal and grain boundary portions, the grains of the magnetic crystal of the first layer of the magnetic recording layer contacting the first underlayer,
    wherein the grain boundary portions contain a material selected from the group consisting of carbon and carbide,
    wherein the first underlayer has a NaCl structure with a (001) orientation,
    wherein the second underlayer includes regions having a shape formed on the first underlayer, and
    wherein the regions having a shape are net-shaped regions.

6. The perpendicular magnetic recording medium according to claim 5, wherein the grains of a magnetic crystal contain a $L1_0$-based ordered alloy.

7. The perpendicular magnetic recording medium according to claim 5, wherein the grains of a magnetic crystal contain a FePt alloy or a CoPt alloy.

8. The perpendicular magnetic recording medium according to claim 5, wherein the grains of a magnetic crystal have an axis of easy magnetization perpendicular to the principal surface of the non-magnetic substrate.

9. A perpendicular magnetic recording medium, comprising:
    a non-magnetic substrate;
    an underlayer provided on the non-magnetic substrate, the underlayer including first and second underlayers, the second underlayer formed on the first underlayer; and
    a magnetic recording layer provided on the underlayer, the magnetic recording layer including a first layer having a granular structure comprising grains of a magnetic crystal and grain boundary portions, the grain boundary portions of the magnetic recording layer contacting the first underlayer,
    wherein the grain boundary portions contain a material selected from a group consisting of carbon and carbide,
    wherein the first underlayer has a NaCl structure with a (001) orientation and contains a nitride of at least one element selected from the group consisting of Cr, V, Ti, Sc, Mo, Nb, Zr, Y, Al, and B, and
    wherein the second underlayer includes a plurality of island-shaped regions formed on the first underlayer containing at least one element selected from the group consisting of Mg, Ca, Co, and Ni.

10. The perpendicular magnetic recording medium according to claim 9, wherein the grains of a magnetic crystal contain a $L1_0$-based ordered alloy that is a FePt alloy or a CoPt alloy, and wherein the grain boundary portions contain a material selected from the group consisting of carbon and carbide.

11. The perpendicular magnetic recording medium according to claim 9, wherein the grains of a magnetic crystal have an axis of easy magnetization perpendicular to a principal surface of the non-magnetic substrate.

12. A perpendicular magnetic recording medium, comprising:
    a non-magnetic substrate;
    underlayer provided on the non-magnetic substrate, the underlayer including first and second underlayers, the second underlayer formed on the first underlayer; and
    a magnetic recording layer provided on the underlayer, the magnetic recording layer including a first layer having a granular structure comprising grains of a magnetic crystal and grain boundary portions, the grains of the magnetic crystal of the first layer contacting the first underlayer,
    wherein the first underlayer has a NaCl structure with a (001) orientation and contains an oxide of at least one element selected from the group consisting of Mg, Ca, Co, and Ni,
    wherein the second underlayer includes net-shaped regions formed on the first underlayer containing at least one element selected from the group consisting of Cr, V, Ti, Sc, Mo, Nb, Zr, Y, Al, and B, and wherein the grain boundary portions contain a material selected from a group consisting of carbon and carbide.

13. The perpendicular magnetic recording medium according to claim 12, wherein the grains of a magnetic crystal contain a $L1_0$-based ordered alloy that is a FePt alloy or a CoPt alloy, and wherein the grain boundary portions contain a material selected from the group consisting of carbon and carbide.

14. The perpendicular magnetic recording medium according to claim 12, wherein the grains of a magnetic crystal have an axis of easy magnetization perpendicular to a principal surface of the non-magnetic substrate.

* * * * *